United States Patent
Rostedt

(10) Patent No.: US 8,127,074 B2
(45) Date of Patent: Feb. 28, 2012

(54) MECHANISM FOR A READER PAGE FOR A RING BUFFER

(75) Inventor: Steven D. Rostedt, Endwell, NY (US)

(73) Assignee: Red Hat, Inc., Raleigh, NC (US)

( * ) Notice: Subject to any disclaimer, the term of this patent is extended or adjusted under 35 U.S.C. 154(b) by 418 days.

(21) Appl. No.: 12/481,376

(22) Filed: Jun. 9, 2009

(65) Prior Publication Data

US 2010/0312975 A1    Dec. 9, 2010

(51) Int. Cl.
*G06F 12/00* (2006.01)
(52) U.S. Cl. .................................................. 711/110
(58) Field of Classification Search .................. None
See application file for complete search history.

(56) References Cited

U.S. PATENT DOCUMENTS

| | | | |
|---|---|---|---|
| 6,124,869 A * | 9/2000 | Miller et al. | 345/544 |
| 7,620,753 B1 * | 11/2009 | Beaman et al. | 710/56 |
| 2009/0204755 A1 * | 8/2009 | Rushworth et al. | 711/110 |

OTHER PUBLICATIONS

Rostedt, S., The World of Ftrace, http://people.redhat.com/srostedt/ftrace-world.odp, Apr. 9, 2009, 33 pgs.

* cited by examiner

*Primary Examiner* — Hiep Nguyen
(74) *Attorney, Agent, or Firm* — Lowenstein Sandler PC

(57) ABSTRACT

In one embodiment, a mechanism for a reader page for a ring buffer is disclosed. In one embodiment, a method for implementing a reader page for a ring buffer includes allocating, by a processing device, a block of storage separate from a ring buffer as a reader page for a reader of the ring buffer, the ring buffer stored in a physical memory device, and swapping, by the processing device, a head page of the ring buffer with the reader page so that the reader page is part of the ring buffer and the head page is no longer attached to the ring buffer.

20 Claims, 6 Drawing Sheets

MECHANISM FOR A READER PAGE FOR A RING BUFFER

RELATED APPLICATION

The present application is related to co-filed U.S. patent application Ser. No. 12/481,397 entitled "Mechanism for a Lockless Ring Buffer in Overwrite Mode", which is assigned to the assignee of the present application.

TECHNICAL FIELD

The embodiments of the invention relate generally to ring buffers and, more specifically, relate to a mechanism for a reader page for a ring buffer.

BACKGROUND

Tracing is a specialized use of logging to record information about a program's execution. This information is typically used by programmers for debugging purposes, and additionally, depending on the type and detail of information contained in a trace log, by experienced system administrators or technical support personnel to diagnose common problems with software. Often times, tracing utilities implemented ring buffers as the data structure to store the information obtained by the trace utility. Tasks that write into the ring buffer are known as writers or producers. Tasks that read from the ring buffer are known as readers or consumers.

One problem with respect to a trace utility using a ring buffer for collecting data, is the race condition encountered by readers and writers of a ring buffer that is operating in overwrite mode. Overwrite mode refers to the mode of the ring buffer where if the writer was to fill up the buffer before the reader could free up anything, the writer would continue writing and overwrite the oldest data in the ring buffer. This mode loses the oldest events stored in the ring buffer. As a result, if a ring buffer is in overwrite mode, both the reader and the writer are capable of accessing the head page and pushing the head page forward in the ring buffer, creating the above-mentioned race condition.

The typical solution to handle the race condition between readers and writers in a ring buffer operating in overwrite mode is with counters. The reader would simply copy the data, and check if the writer had overwritten it since the reader read and copied the data. If it did, the reader would try to copy again. That is, the writer would set a bit in the counter to show that it is going to do a write. Then, the writer would write the data and clear the counter, as well as increment it. The reader would read the counter (waiting if the writer bit is set), read the data, and check the counter to make sure a write did not happen in the meantime. If a write did, the reader would need to read again.

The problem with the above counter approach is that multiple copies are needed. If the data in the ring buffer is to be passed off to higher layers, once this pass is made to the higher layer, the higher layer cannot be expected to check if a writer came by before the data was used. Furthermore, it is not desirable to have to copy the data before passing it off to the higher layer because of the expensive and inefficiency associated with that requirement.

As a result, a way to prevent the race condition between readers and writers of a ring buffer in overwrite mode without having to use counters and copying of the prior art solutions would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
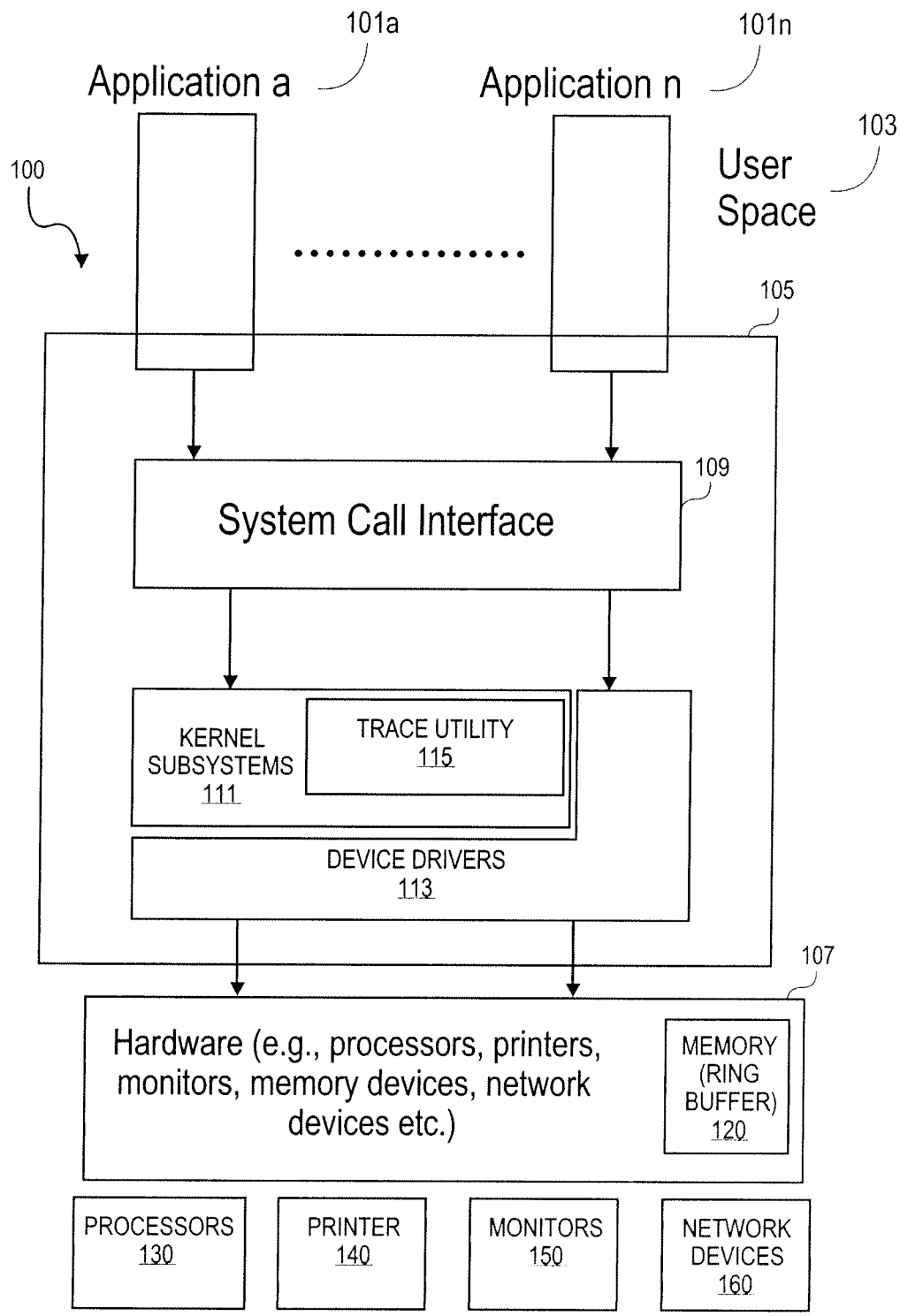
FIG. 1 is a block diagram of a system for implementing a reader page in a ring buffer according to an embodiment of the invention.

Embodiments of the invention provide for a mechanism for a reader page for a ring buffer. In one embodiment, a method for implementing a reader page for a ring buffer includes allocating, by a processing device, a block of storage separate from a ring buffer as a reader page for a reader of the ring buffer, the ring buffer stored in a physical memory device, and swapping, by the processing device, a head page of the ring buffer with the reader page so that the reader page is part of the ring buffer and the head page is no longer attached to the ring buffer.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for implementing a reader page for a ring buffer. The reader page of embodiments of the invention is a separate block of storage solely used by a reader of the ring buffer and is not part of the ring buffer. Having a separate reader page where once the writer is off of it, it will never come back onto the page, makes the reader page "owned" by the reader. When the reader has the page it no longer needs to worry about races with the writer.

FIG. 1 is a block diagram of a system 100 for implementing a reader page for a ring buffer according to an embodiment of the invention. In particular, FIG. 1 shows the relationship between applications 101a-n, kernel 105, and hardware 107. Application programs 101a-n can include, for example, conventional word processing, graphic, and/or web browser programs, which directly interact with an end user. Application programs 101a-n are executed in a user space 103, and can be referred to as "processes," or "tasks" when program instructions are executed by the central processing unit (CPU) or multiple CPUs (not shown).

Kernel 105 includes system call interface 109, kernel subsystems 111, and device drivers 113. Application programs 101a-n communicate with kernel by making a conventional system call. System call interface 109 can receive requests from processes to access hardware 107 such as processors 130, printers 140, monitors 150, memory devices 120, and/or network devices 160, to name a few examples. Kernel 105 can execute these requests via kernel subsystems 111 and device drivers 113 in a conventional manner. Kernel subsystems 111 can also include interrupt handlers to service interrupt requests, a memory management system to manage address spaces, and system services such as networking and interprocess communications (IPC).

In one embodiment, kernel subsystems 111 include a trace utility 115. Trace utility 115 operates to examine the flow of execution (between processes, kernel threads, and interrupts) in system 100. Trace utility 115 is useful for analyzing where delays occur in the system 100, and to see how processes interact (especially with regard to scheduling, interrupts, synchronization primitives, etc.) Trace utility 115 records all of the data it tracks into memory 120.

In one embodiment, memory 120 is implemented as a ring buffer with an associated reader page. In some embodiments trace utility 115 writes data it collects to a plurality of ring buffers each located on an individual processor of a multiprocessor system.

In one embodiment, a ring buffer is an area of storage that acts as a circular storage area with a head and a tail. If the tail meets the head, then the buffer is considered full. Writes to the buffer are done at the "tail" and reads are done at the "head". It is called a ring buffer because the actual storage may be in an array. But the beginning and end of the array are not what defines the beginning and end of the buffer. If a write is at the end of the array, it will simply start writing at the beginning of the array, thus making a "ring".

The ring buffer of embodiments of the invention is made up of a list of pages held together by a link list. Each block of storage used by the ring buffer is called a page. Each page includes a next pointer to the page after the present page in the ring buffer. In some embodiments, the pages of the ring buffer may also include a previous pointer to the page before the present page in the ring buffer forming a double linked list that can be traversed via the previous and next pointers. However, embodiments of the invention may work equally with either of a link list or double link list.

In addition, the ring buffer of embodiments of the invention also utilized pointers to identify a reader page, a head page, a tail page, and a commit page, as well as locations within the tail and commit pages, in the ring buffer. The ring buffer of embodiments of the invention uses a head, commit, read, and tail page pointer, as well as a commit and tail index pointer. The reader_page pointer identifies a page outside of the ring buffer used solely (for the most part) by the reader. The head_page pointer identifies a page in the ring buffer that the reader will use next. The tail_page pointer identifies a page in the ring buffer that will be written to next by the writer. The tail_page_index pointer points to a place within the tail page where the last write request occurred. The commit_page pointer identifies a page in the ring buffer with the last finished non-nested write. The commit_page_index points to the place within the commit page where the last finished non-nested write has been finished and committed. If the tail or commit index pointers cross over to a next page, then the tail and page pointers will also be updated to the next page as well.

Ring buffers have both writers and readers that operate on the ring buffer. A writer is a task that writes into the ring buffer. As writer may also be known as a producer. A reader is a task that reads from the buffer. A reader may also be known as a consumer. Typically, a ring buffer operates in one of two modes: producer/consumer mode or overwrite mode. Producer/consumer mode is where if the producer was to fill up the buffer before the consumer could free up anything, the producer would stop writing to the buffer. This will lose most recent events. Overwrite mode is where if the produce was to fill up the buffer before the consumer could free up anything, the producer would overwrite the older data. This will lose the oldest events.

The writers and readers of the ring buffer of embodiments of the invention follow certain guidelines.

Figure 2A:
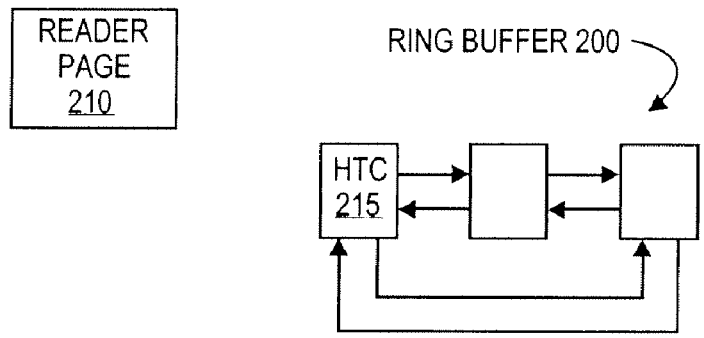
FIGS. 2A through 2D are block diagrams of a ring buffer utilizing a reader page according to an embodiment of the invention.
Figure 2B:
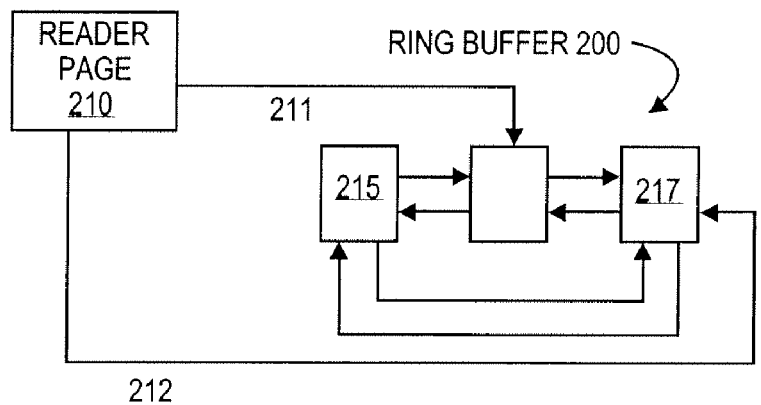
Figure 2C:
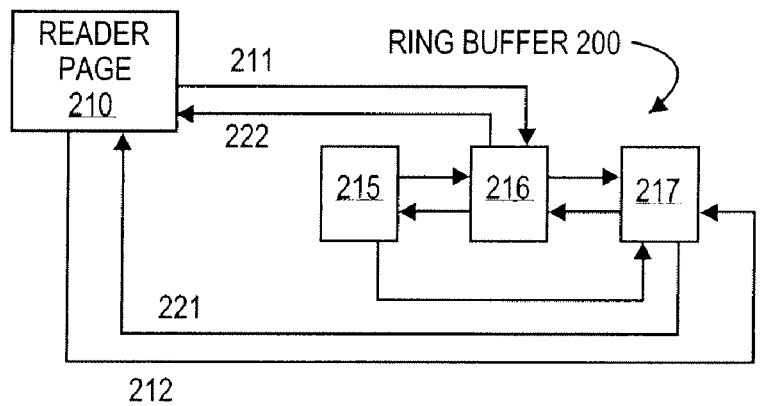

In one embodiment, at initialization of the ring buffer of embodiments of the invention, a reader page is allocated for the reader that is not part of the ring buffer. FIGS. 2A through 2C are block diagrams of a ring buffer 200 utilizing a reader page according to an embodiment of the invention.

FIG. 2A is a block diagram illustrating such a ring buffer 200 with an associated reader page 210. The head_page, tail_page and commit_page pointers are all initialized to point to the same page 215. The reader has its own page 210 to use. At start up time, this page 210 is allocated but is not attached to the ring buffer 200. FIG. 2B illustrates how the reader page 210 is initialized to have its next pointer 211 pointing to the head page 215, and its previous pointer 212 pointing to the page 217 before the head page 215.

When the reader wants to read from the buffer, it performs a page swap with the head page 215 of the ring buffer 200. FIG. 2C illustrates such a page swap. The old reader page 210 becomes part of the ring buffer 200 and the head page 215 is removed from the ring buffer 200. A new next pointer 221 and previous pointer 222 point to the old reader page 210 in order to make this page 210 part of the ring buffer 200. Page 216 is now the new head page. Note that the previous reader page 210 that was swapped into the ring buffer 200 does not become a head page.

Figure 2D:
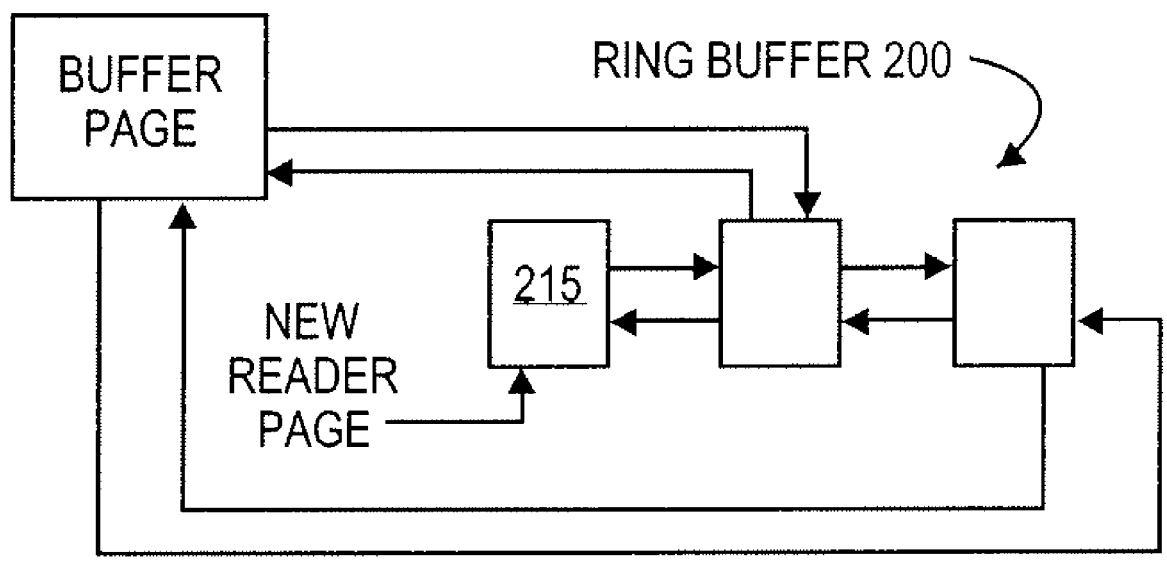

The final status of the ring buffer 200 and its associated reader page after the page swap is shown in FIG. 2D. Once page 215 is given via the swap to the reader, it becomes the new reader page 215 and the reader may do what it wants with this page as long as a writer is still not on the page.

In some embodiments, it is possible that the page swapped into the reader page is the commit page and the tail page. This situation occurs if the entire amount of data stored in the ring buffer is less than what is held in a buffer page. This situation is allowed by embodiments of the invention. When the writer leaves the reader page, it simply goes into the ring buffer because the reader page always points to the next location in the ring buffer.

Figure 3A:
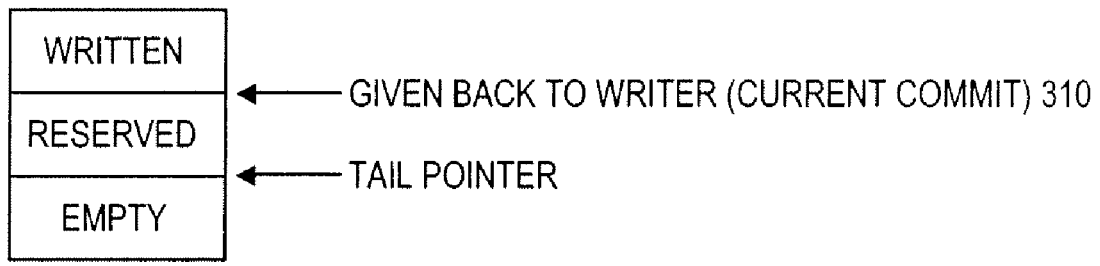
FIGS. 3A and 3B are block diagrams of illustrating the function of the commit page pointer for a ring buffer according to an embodiment of the invention.
Figure 3B:

FIGS. 3A and 3B are block diagrams illustrating the function of the commit_page pointer for a ring buffer 300 according to an embodiment of the invention. FIG. 3A illustrates a page 300 of a ring buffer having data written to it. As shown, a position, known as a current commit 310, is reserved in the ring buffer and passed back to the writer as a pointer. FIG. 3B illustrates the same page 300 of the ring buffer when the writer is finished writing the data of FIG. 3A. As shown, when the writer finishes writing the data into the reserved position, it commits the write by moving the current commit 310 to the end of the data just written.

In one embodiment, there is a special case when the head page is after the commit/tail page. This occurs when the commit/tail page has been swapped with the reader page. This is because the head page is always part of the ring buffer, but the reader page is not. Whenever there has been less than a full page that has been committed inside the ring buffer, and a reader swaps out a page, it will be swapping out the commit/tail page. In this case, the head page will not move when the commit/tail move back into the ring buffer.

The reader cannot swap a page into the ring buffer if the commit/tail page is still on the reader page. If the read meets the last commit (real commit not pending or reserved), then there is nothing more to read. The buffer is considered empty until another full commit finishes.

A ring buffer utilizing the reader page described above has a few key differences between its operation in producer/consumer mode and its operation in overwrite mode. For instance, if the buffer is in overwrite mode, when the tail meets the head page, the head page will be pushed ahead one page. In contrast, if the buffer is in producer/consumer mode, the write will fail. Note that in this case the reader page will still point to the previous head page. However, when a swap takes place, it will use the most recent head page.

Figure 4:
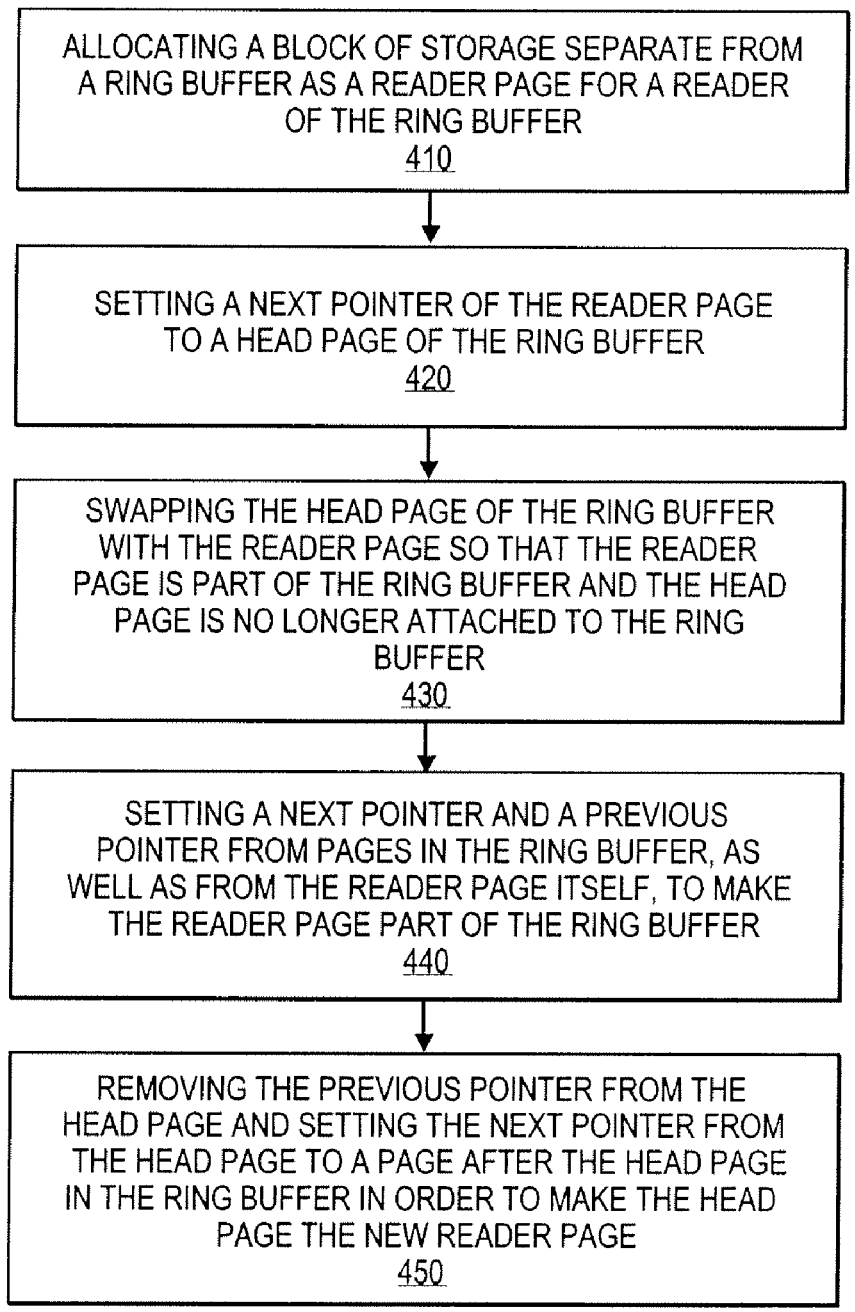
FIG. 4 is a flow diagram illustrating a method to implement a reader page for a ring buffer according to an embodiment of the invention.

FIG. 4 is a flow diagram illustrating a method 400 for implementing a reader page for a ring buffer according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by system 100, and more specifically tracing utility 115 and processors 130 of system 100, described with respect to FIG. 1.

Method 400 begins at block 410 where a block of storage is allocated separate from a ring buffer. This allocated block of storage is a reader page to be used by a reader of the ring buffer. Then, at block 420, a next pointer of the reader page is set to a head page of the ring buffer. At block 430, the head page of the ring buffer is swapped with the reader page. As a result of the swap, the reader page is now part of the ring buffer and the head page is no longer attached to the ring buffer.

Subsequently, at block 440, a next pointer and a previous pointer from pages in the ring buffer, as well as from the reader page itself, are set to make the reader page part of the ring buffer. In one embodiment, this means setting a next pointer of the page previous to the old page to the reader page. It also means setting a previous pointer of the page after the old head page to the reader page. In addition, a previous pointer of the reader page is set to the page previous to the old head and the next pointer of the reader page is set to the page after the old head page. This page after the old head page is now the new head page. In this way, the reader page is now part of the ring buffer.

Lastly, at block 450, the previous pointer from the old head page is removed and the next pointer from the old head page is set to the page after the old head page. As noted previously, this page after the old head page is now the new head page. In addition, the old head page is now the new reader page and no longer attached to the ring buffer so that a reader of the ring buffer may manipulate this new reader page as it sees fit.

Figure 5:
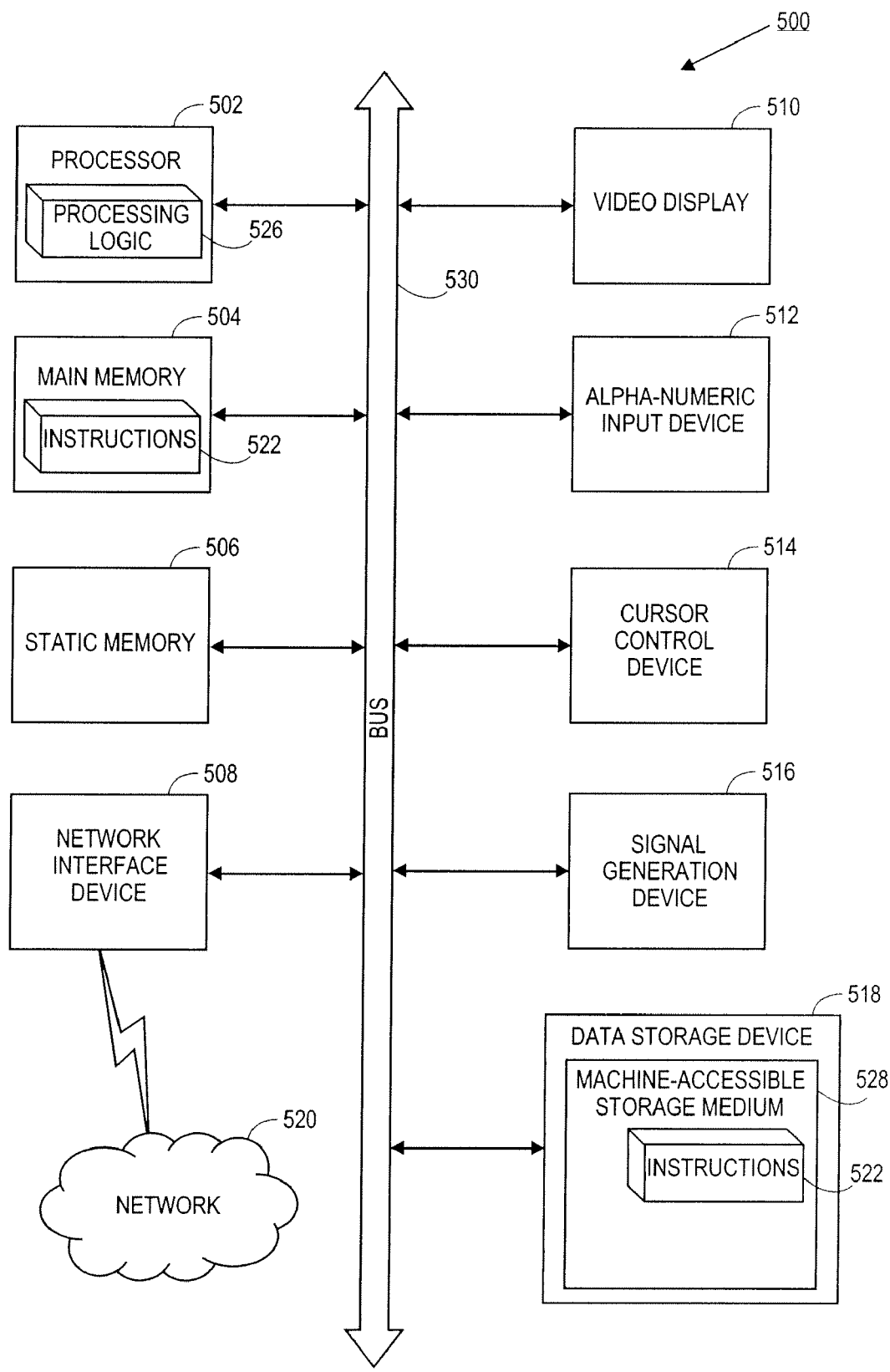
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform method 400 to provide a reader page for a ring buffer as described with respect to FIG. 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
    allocating, by a processing device, a block of storage separate from a ring buffer as a reader page for a reader of the ring buffer, the ring buffer stored in a physical memory device; and
    swapping, by the processing device, a head page of the ring buffer with the reader page so that the reader page is part of the ring buffer and the head page is no longer attached to the ring buffer.

2. The method of claim 1, wherein the ring buffer is operating in overwrite mode.

3. The method of claim 1, wherein allocating the reader page further comprises setting a next pointer of the reader page to the head page of the ring buffer.

4. The method of claim 1, wherein swapping the head page with the reader page further comprises setting a next pointer and a previous pointer from pages in the ring buffer to make the reader page part of the ring buffer.

5. The method of claim 1, wherein after the swapping of the head page and the reader page, the head page is a new reader page.

6. The method of claim 5, wherein if a writer to the ring buffer is on the new reader page after the swapping of the head page with the reader page, then the writer returns back into the ring buffer when it leaves the reader page.

7. The method of claim 1, wherein the ring buffer includes a pointer to a commit page identifying the last finished write by a writer to the ring buffer.

8. The method of claim 7, wherein the pointer to the commit page is the same as the pointer to a tail page of the ring buffer.

9. A system, comprising:
    a storage device to store a ring buffer;
    one or more device drivers to control the storage device; and
    a kernel communicably coupled to the one or more device drivers and the storage device, the kernel including a tracing utility to:
        allocate a block of storage from the storage device separate from the ring buffer as a reader page for a reader of the ring buffer; and
        swap a head page of the ring buffer with the reader page so that the reader page is part of the ring buffer and the head page is no longer attached to the ring buffer.

10. The system of claim 9, wherein the tracing utility to allocate the reader page further comprises the trace utility to set a next pointer of the reader page to the head page of the ring buffer.

11. The system of claim 9, wherein the trace utility to swap the head page with the reader page further comprises the trace utility to set a next pointer and a previous pointer from pages in the ring buffer to make the reader page part of the ring buffer.

12. The system of claim 9, wherein after the trace utility swaps the head page and the reader page, the head page is a new reader page.

13. The system of claim 12, wherein if a writer to the ring buffer is on the new reader page after the swapping of the head page with the reader page, then the writer returns back into the ring buffer when it leaves the reader page.

14. The system of claim 9, wherein the ring buffer includes a pointer to a commit page identifying the last finished write by a writer to the ring buffer.

15. The system of claim 14, wherein the pointer to the commit page is the same as the pointer to a tail page of the ring buffer.

16. A non-transitory machine-readable storage medium including data that, when accessed by a machine, cause the machine to perform operations comprising:
    allocating a block of storage separate from a ring buffer as a reader page for a reader of the ring buffer; and
    swapping a head page of the ring buffer with the reader page so that the reader page is part of the ring buffer and the head page is no longer attached to the ring buffer.

17. The non-transitory machine-readable storage medium of claim 16, wherein allocating the reader page further comprises setting a next pointer of the reader page to the head page of the ring buffer.

18. The non-transitory machine-readable storage medium of claim 16, wherein swapping the head page with the reader page further comprises setting a next pointer and a previous pointer from pages in the ring buffer to make the reader page part of the ring buffer, and wherein after the swapping of the head page and the reader page, the head page is the new reader page.

19. The non-transitory machine-readable storage medium of claim 18, wherein if a writer to the ring buffer is on the new reader page after the swapping of the head page with the reader page, then the writer returns back into the ring buffer when it leaves the reader page.

20. The non-transitory machine-readable storage medium of claim 16, wherein the ring buffer includes a pointer to a commit page identifying the last finished write by a writer, and wherein the pointer to the commit page is the same as the pointer to a tail page of the ring buffer.

* * * * *